Nov. 30, 1948.            A. W. SEYFRIED                 2,455,026
                      MOTOR DRIVEN FOOD MIXER
Filed March 20, 1945                              2 Sheets-Sheet 1
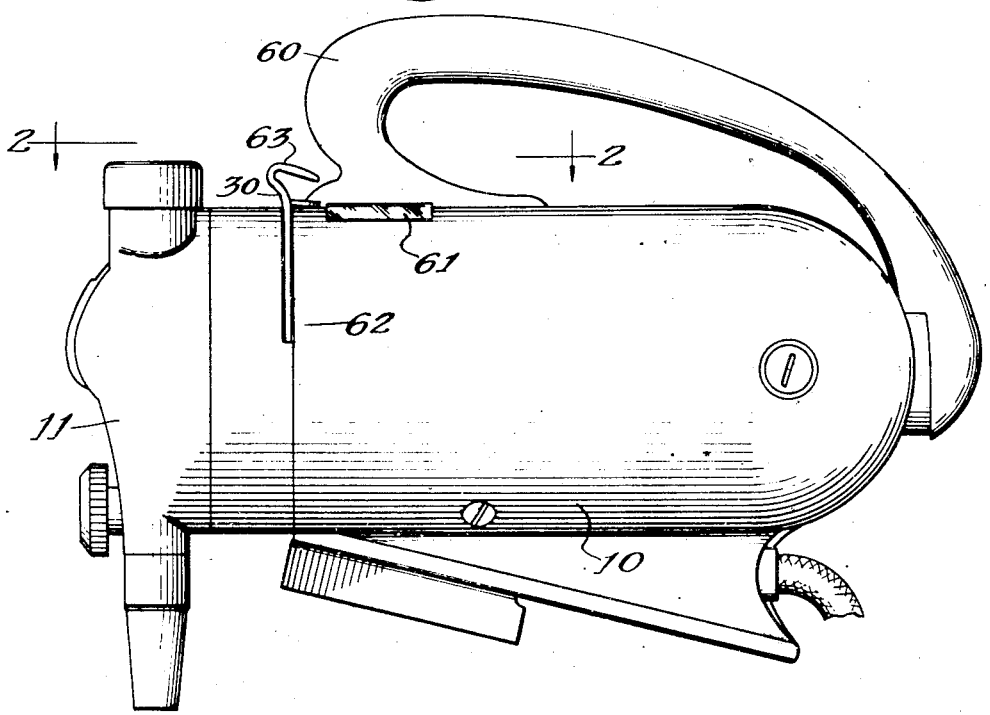
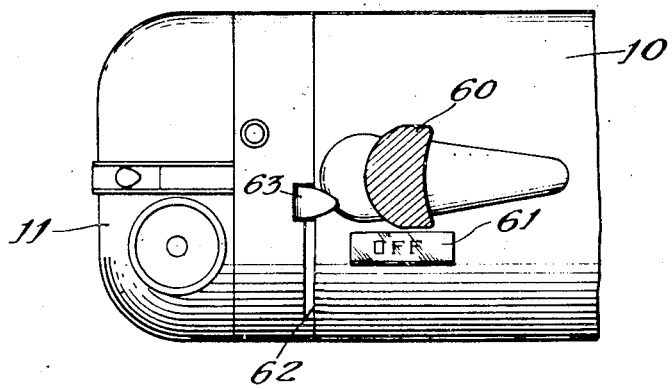
Inventor:
Arthur W. Seyfried
Bertha L. Mac Gregor
              Attorney Nov. 30, 1948.   A. W. SEYFRIED   2,455,026
MOTOR DRIVEN FOOD MIXER
Filed March 20, 1945   2 Sheets-Sheet 2
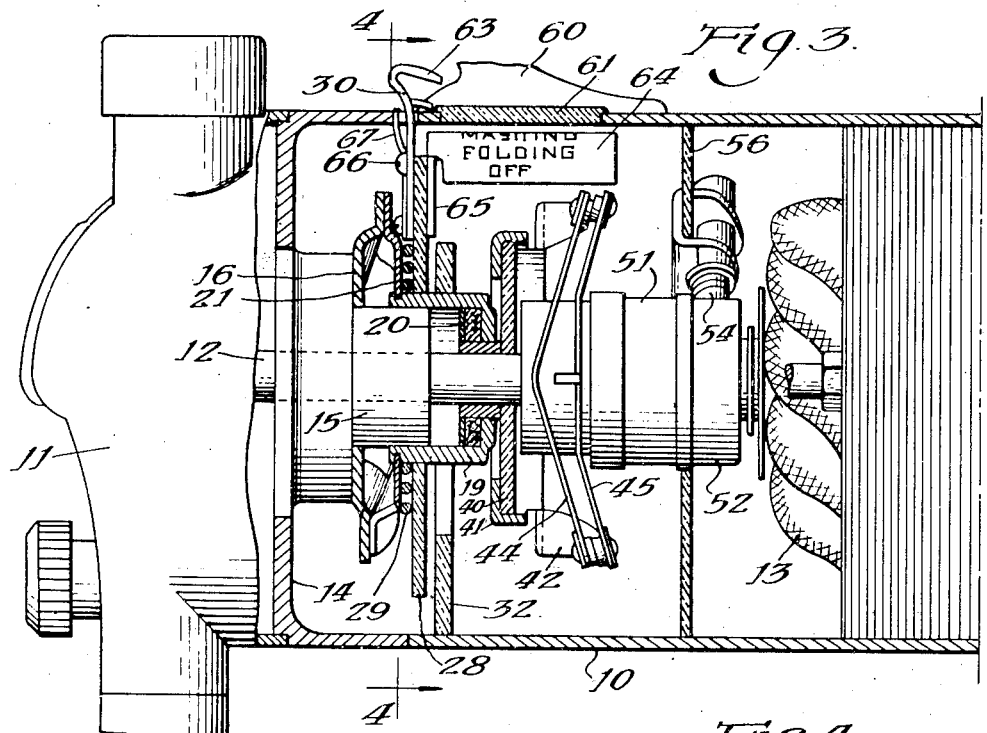
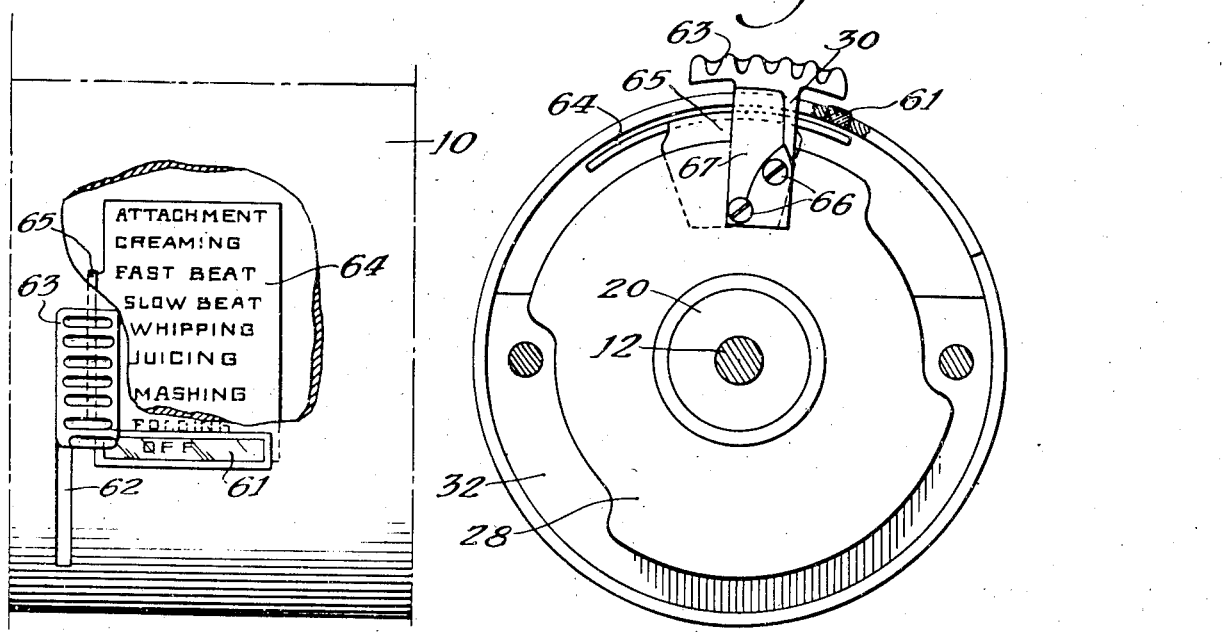
Inventor
Arthur W. Seyfried
Bertha L. MacGregor
Attorney Patented Nov. 30, 1948

2,455,026

UNITED STATES PATENT OFFICE 2,455,026

MOTOR-DRIVEN FOOD MIXER

Arthur W. Seyfried, Racine, Wis., assignor to Scovill Manufacturing Company, Waterbury, Conn., a corporation of Connecticut Application March 20, 1945, Serial No. 583,789

2 Claims. (Cl. 172—36)

This invention relates to motor driven food mixers, and more particularly to mixing indicator means provided for the purpose of aiding the operator in selecting the motor speed suitable for mixing different kinds of ingredients and producing different types of mixtures.

Heretofore the power units of food mixers have been provided with means for controlling motor speeds, and with manually actuated levers for adjusting the speed. Usually the motor housing has been supplied with a numerical scale located adjacent a slot through which extends the lever for controlling the motor shaft speed. Such numerical scales are embossed on the motor casing in the material of the casing and are difficult to read. Furthermore, it is necessary for the operator first to read the instruction book to determine the proper speed for mixing certain types of ingredients, and then to select the appropriate speed and set the indicator. All prior art food mixers known to me, which are provided with speed indicators, have scales of the exposed type, which are objectionable because they are subject to filling in by flour and other food ingredients the removal of which is injurious to the motor for the reason that soap and water get into the switch and other motor parts and give serious trouble especially if the motor is used while the internal parts are moist. Another objection is the fact that the exposed scales are subject to injury in the handling of the mixer motor.

The main object of this invention is to provide a food mixer power unit with means for positively indicating the motor speed suitable for different kinds of work, and with means for controlling the speed and manually adjusting the speed control mechanism for the selected mixing operation.

Another object is to make the indicator and speed adjusting means clearly visible and easily accessible to the operator.

Other objects and advantages will be apparent from the drawings and following description.

In the drawings:

Fig. 1 is a side elevation of a food mixer power unit embodying my invention.

Fig. 2 is a fragmentary plan view of the same, partly in section, taken in the plane of the line 2—2 of Fig. 1.

Fig. 3 is a longitudinal, vertical sectional view of part of the power unit, partly in elevation.

Fig. 4 is a transverse sectional view taken in the plane of the line 4—4 of Fig. 3, looking in the direction indicated by the arrows.

Fig. 5 is an enlarged fragmentary view of part of the motor casing, showing the mixing indicator scale and the speed control lever.

In that embodiment of the invention which I have chosen to illustrate in the drawings, the power unit is provided with the speed controlling mechanism shown and described in U. S. Patent No. 2,109,732, dated March 1, 1938. Said mechanism having been fully disclosed in the aforementioned patent, and since other speed control means may be employed in combination with my invention, it is deemed proper to describe the mechanism briefly and without reference to details. The numerals herein applied to parts of the speed control mechanism correspond to similar parts in said Patent No. 2,109,732, and because reference to details of construction has been avoided, the numerical designations are not consecutive.

The motor casing 10 is provided with a gear housing 11 at one end, and a motor shaft 12 is mounted in the motor casing and extends into said gear housing. Armature coils are indicated at 13. An end cover 14 divides the motor and gear chambers. A centrally apertured hub 15 is mounted on the motor shaft 12. Other parts of the motor speed controlling mechanism as shown and described in the aforementioned patent, include the disc 16, cup shaped hub with portion 19 and apertured end 20, disc 21 secured to the portion 19, and the indicator disc 28. A spring 29 is located between the parts 21 and 28. The control lever 30 is connected to the indicator disc 28. Also mounted on the motor shaft is the stationary insulating ring 32, and the rotated fibre disc 40 and offset ring 41 provided with ears 42. The spring metal arms 44 and 45 are centrifugally influenced by the rotation of the motor shaft. Collector rings 51, 52, brush 54 and brush holder ring 56 are part of the mechanism. When the indicator lever 30 is moved to desired position, a contact member on the disc 28 contacts with contact members on the fixed ring 32, allowing current to flow to the motor. The manual actuation of the disc 28 also alters the position of the rotatable disc 21 and hub 19—20 by reason of the engagement of a part of the disc 21 with the indicator disc 28. The axial position of the hub 19—20 is controlled by the relative positions of parts of the discs 16 and 21. Thus the hub 20 and disc 21 when moved axially toward the right or armature end of the shaft 12, cause the disc 40 and ring 41 to be moved to the right, to exert pressure on opposite ends of the arms 45, thereby bending the arms 45 away from the arms 44, and controlling the effect of the centrifugal influence on said arms resulting from rotation of shaft 12. The operation of the above mentioned, herein briefly described, speed controlling mechanism is fully explained in the said patent.

The indicator disc 28 and its control lever 30 have been utilized in embodying my invention in the power unit. My mixing indicator means comprises a specially prepared scale located in the motor casing, just below the handle 60, where I have provided a window opening covered with pane 61 of magnifying glass. At the side of the window is the slot 62 through which extends the manually operable control lever 30, which preferably is provided with a pointer or a roughened fingerhold 63 as desired. The specially prepared mixing or direction scale is indicated at 64 and it is located within the casing 10 so as to be visible through the glass 61 when moved across the window.

The scale 64 may be made of a thin piece of metal or other suitable material curved on the arc of the motor housing. It is provided with an integrally formed plate or tab 65 adapted to abut the face of the indicator disc 28 near its peripheral edge, and is connected to said disc by the screws or rivets 66. A spring 67 retains the disc 28 and lever 30 in selected position. Preferably the scale and speed control mechanism are arranged so that when the control lever 30 is at the top of the slot 62, the current is cut off and the motor shaft is inoperative, with the word "off" on the scale 64 showing through the window 61, as indicated in Figs. 2, 3 and 5.

The indicator scale 64 and the disc 28 of the speed control mechanism are correlated so that the motor speed will be proper for the mixing indicia visible through the window 61.

Careful experimentation has taught me that a predetermined slow speed is required for folding mixtures; that mashing, juicing and whipping operations require relatively slow but increased speeds in the order stated. Above these on the scale appear "Slow beat," "Fast beat," and "Creaming." These operations require different speeds, higher than are proper for the "Mashing," "Juicing" and "Whipping" operations noted lower down on the scale. At the top of the scale, indicating the highest speed, is the notation "Attachment," meaning that high speed is required for operating a coffee grinder, food grinder, and other attachments which may be mechanically connected with the power unit of the food mixer.

Additional gradations and indications may be provided on the scale 64. The operation of the speed controlling mechanism is such that the motor shaft speed can be increased or decreased gradually over a wide range of speeds within the motor capacity, and stops for the control lever 30—63 may be indicated in desired number on the scale 64 to be visible through the window in the casing 10.

The magnifying glass 61 makes the scale 64 plainly visible, and the provision of the scale takes the guess-work out of the proper mixing of a large variety of ingredients and types of mixtures.

Changes may be made in details of construction without departing from the scope of my invention as set forth in the appended claims.

I claim:

1. In a motor driven food mixer comprising a motor, a cylindrical motor housing having a circumferentially extending slot in the wall thereof, speed control mechanism located in the motor housing adjacent said slot and including a rotatable disk, and a manually operable control lever connected to one side of said disk and extending through said slot for free floating movement therein; the improvement, which comprises an elongated relatively narrow window in the housing wall adjacent said slot and disposed at right angles thereto, a mixing indicator member including a flange portion connected to the other side of said disk for movement with said lever, a spring on said one side of the disk and bearing against a wall of the circumferentially extending slot, said indicator member further including a relatively thin arcuate plate conforming with the wall of the housing and disposed adjacent said wall within the housing for movement directly beneath said window upon movement of the lever in said slot in effecting adjustment of the motor speed, and individual indicia on said plate designating various operations at predetermined motor speeds and being individually visible through said window upon movement of the lever to effect the corresponding motor speeds.

2. The structure according to claim 1 wherein said housing is provided with a handle connected thereto adjacent its forward and rear ends, said window being disposed adjacent the forward junction of the handle with the housing, said spring connected to the side of said lever opposite said disk yieldably and frictionally bearing on one edge of the slot for maintaining said lever and indicator plate in selected position.

ARTHUR W. SEYFRIED.

REFERENCES CITED

The following references are of record in the file of this patent:

UNITED STATES PATENTS

| Number | Name | Date |
|---|---|---|
| 1,763,225 | Davis | June 10, 1930 |
| 1,782,368 | Schiebel | Nov. 18, 1930 |
| 2,013,939 | Williams | Sept. 10, 1935 |
| 2,109,732 | Neilsen | Mar. 1, 1938 |
| 2,274,480 | Jepson | Feb. 24, 1942 |
| 2,310,303 | Masllorens | Feb. 9, 1943 |